Feb. 7, 1961   M. J. BAKER ET AL   2,970,555
DISPENSING SCOOP
Filed March 31, 1958   2 Sheets-Sheet 1

INVENTORS
Mayo J. Baker
Tom F. Mason
BY

Feb. 7, 1961 M. J. BAKER ET AL 2,970,555
DISPENSING SCOOP
Filed March 31, 1958 2 Sheets—Sheet 2

INVENTOR.
Mayo J. Baker
Tom F. Mason
BY
*Greek Wells*
atty.

United States Patent Office 2,970,555
Patented Feb. 7, 1961

2,970,555

DISPENSING SCOOP

Mayo J. Baker and Tom F. Mason, both of N. 2822 Division, Spokane, Wash.

Filed Mar. 31, 1958, Ser. No. 725,410

3 Claims. (Cl. 107—48)

Our invention relates to dispensing scoops. It is particularly applicable to such scoops as are used to dip ice cream and similar materials from a container. In dipping and dispensing such materials it has been difficult to find a way of taking out the same amount of material on each dip. It is the purpose of our invention to provide a dispensing scoop that can be pressed down into a mass of such material as ice cream until it is filled, then by a movement that does not change its level or lateral position in the mass, it can break the filling in the scoop free of the mass for lifting out and emptying.

Our invention is embodied in a dispensing scoop comprising essentially a cylinder, a disk therein movable axially of the cylinder from a position near one end to the other end of the cylinder to expel any material filling the cylinder, and finger means in the cylinder extending axially of the cylinder and spaced from its wall, operable when the cylinder is pressed into a mass of ice cream or the like and turned on its own axis, to break the filling within the cylinder free from the mass for removal with the cylinder. The cylinder is carried by a handle and the disc has a stem and a lever connected thereto and removably supported by the handle to move the disk endwise of the cylinder.

The nature and advantages of the invention will appear more fully from the following description and the accompanying drawings wherein a preferred form of the invention is shown. The drawings and description are illustrative only, however, and are not intended to limit the scope of the invention except insofar as it is limited by the claims.

Figure 1:
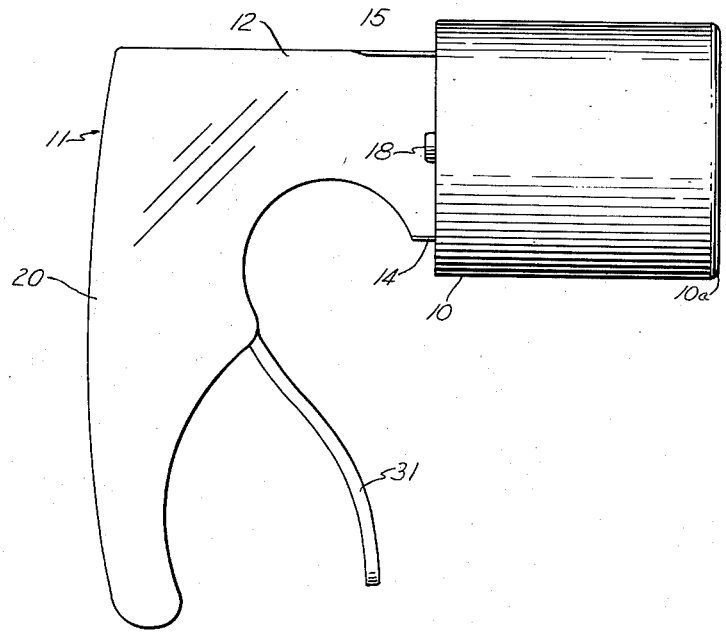
Figure 1 is a view in side elevation of a dispensing scoop embodying the invention.
Figure 2:
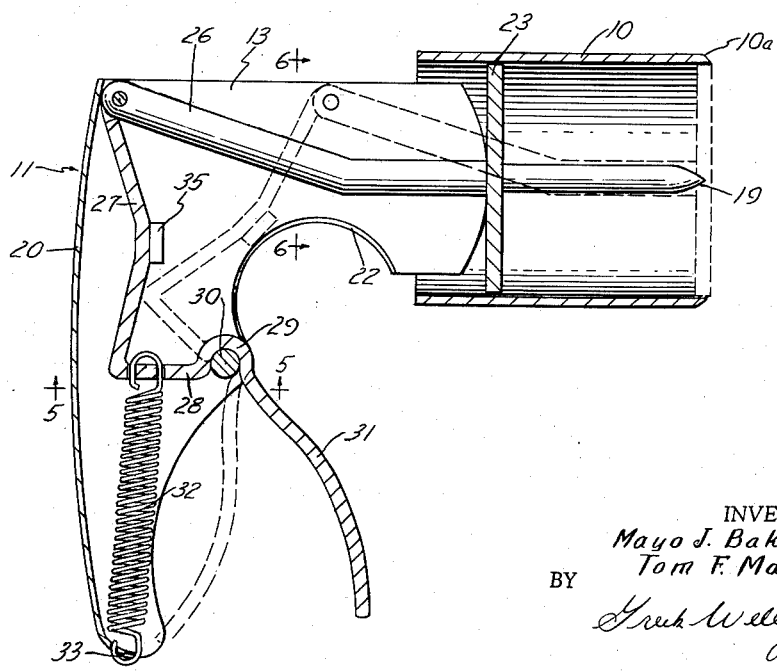
Figure 2 is a sectional view taken vertically through the scoop.
Figure 3:
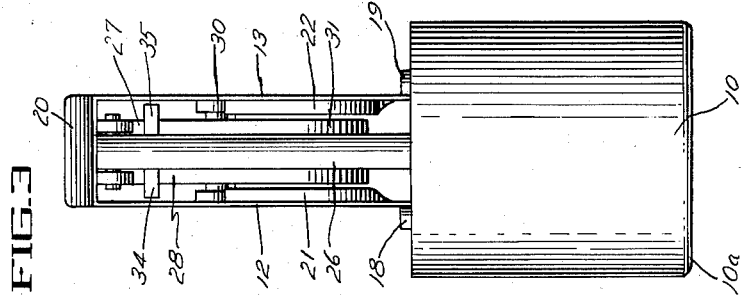
Figure 3 is an end view of the scoop looking at Figure 1 from the right.
Figure 4:
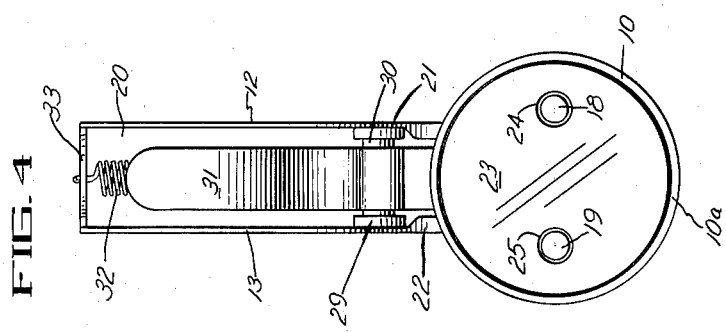
Figure 4 is a bottom plan view of the scoop.
Figure 5:
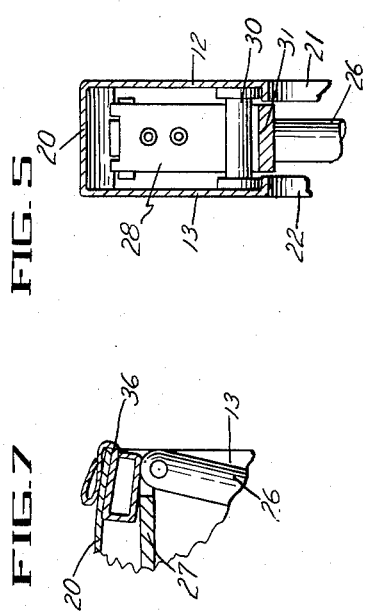
Figure 5 is a sectional view taken on the line 5—5 of Figure 2.
Figure 6:
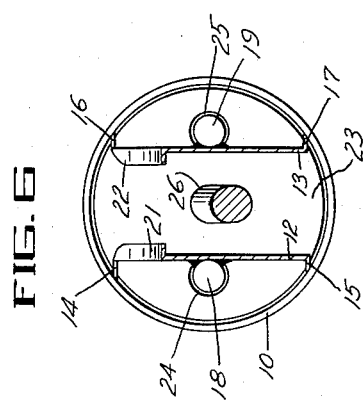
Figure 6 is a sectional view taken on the line 6—6 of Figure 2.

Referring now to the drawings, the dispensing scoop embodies a cylinder 10 which has a handle 11 secured thereto. The handle 11 is formed of sheet metal and includes spaced cylinder mounting bars 12 and 13 which are joined to the cylinder 10 by out-turned flanges 14 and 15 on the bar 12 and like flanges 16 and 17 on the bar 13, the flanges being welded to the cylinder 10. The bars 12 and 13 also support fingers 18 and 19, that extend to the remote end of the cylinder 10. The fingers 18 and 19 are spaced from the cylinder wall. They are provided with tapered tips as shown. The cylinder 10 is also provided with a sharp bottom edge 10a as shown by Figure 2 for greater ease in penetrating the material to be dispensed. The edge 10a is formed by tapering the cylinder wall from the outside surface so that the interior cross-section of the cylinder is the same throughout.

The bars 12 and 13 are generally L-shaped and are joined at the top by a web portion 20 which provides a substantial surface to be engaged by the hand of the operator in pressing the cylinder into a mass of the material to be dispensed. The inside corner portions of the bars 12 and 13 are curved and provided with in-turned flanges 21 and 22. These flanges 21 and 22 function as finger rests for the operator and as guides as will be presently explained.

A disk 23 of substantial thickness is slidable lengthwise within the cylinder 10 and fits smoothly therein. This disk 23 has apertures 24 and 25 therein to receive the fingers 18 and 19. The disk 23 has a stem 26 fixed thereon at its center and extending upwardly between the bars 12 and 13. At its upper end the stem 26 is pivotally connected to a lever 27.

The lever 27 extends from its pivotal connection to the stem 26 between the upper portions of the L-shaped bars 12 and 13 and is bent sharply downward to provide a spring mounting portion 28. This portion 28 is curved to provide a seat 29 for a cross pin 30 that is mounted in the bars 12 and 13. Beyond the seat 29 the lever 27 is extended and curved to provide a hand grip portion 31. A coiled spring 32 connects the portion 28 to a down-turned lip 33 at the free end of the web portion 20. This spring 32 is under tension so that it normally holds the lever 27, the stem 26 and the disk 23 in the full line position shown in Figure 2 of the drawings. By pulling the hand grip portion 31 toward the web 20 the operator can move the lever 27, stem 26 and disk 23 to the dotted line position shown in Figure 2 to discharge the contents of the cylinder 10.

The lever 27 has two lugs 34 and 35 formed thereon substantially midway between the portion 28 and the pivotal connection of the lever 27 to the stem 26. These lugs strike the flanges 21 and 22 to limit the downward movement of the lever 27.

The several parts of the dispensing scoop are made of or plated with a non-corrosive metal that is easily kept clean. The construction is such that all of the parts can be easily sterilized and kept clean. It it is desired to remove the operating parts, the spring 32 is released from the lip 33. This allows the lever and spring to move to the right as shown in Figure 2 and they can be drawn down between the bars 12 and 13 through the cylinder 10 and thus completely removed.

In the use of the scoop for dispensing ice cream, for example, the cylinder 10 is pressed straight down into the mass of ice cream. It is then turned on its own axis. The fingers 18 and 19 keep the ice cream in the cylinder from turning with respect to the cylinder and break it loose from the mass into which the cylinder was pressed. The cylinder is then lifted straight up and the ice cream within the cylinder can be deposited in a cone or dish by using the lever 27 to push the disk 23 down to the dotted line position illustrated in Figure 2.

Figure 7:
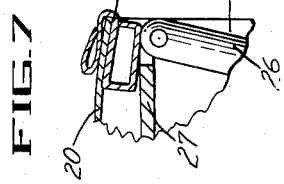
Figure 7 is a detailed view illustrating a modification.

With this dispensing scoop the amount of material dispensed each time is the same. The actions in filling and dispensing are simple. The volume dispensed is controlled by the distance the disk 23 can be moved up in the cylinder. As shown, this distance is limited by the bars 12 and 13. If it is to be made less, a stop can be inserted beneath the web 20 to be engaged by the stem 26. Such a stop is illustrated in Figure 7 at 36.

It is believed that the nature and advantages of the invention will be clear from the foregoing description.

Having described our invention, we claim:

1. A dispensing scoop for frozen confections such as ice cream comprising a cylinder open at both ends, a flat disk in the cylinder movable axially of the cylinder from a position near one end of the cylinder to the other end of the cylinder, a handle having two spaced apart bars extending into the first named end of the cylinder and rigidly secured thereto, means carried by the handle extending into the cylinder between said bars and connected to the disk for moving the disk, a rigid rod rigidly secured to each of said bars and extending axially of the cylinder in spaced relation to the cylinder wall to said other end of the cylinder, the disk having two apertures through which said rods pass, said rods operating upon turning of the cylinder on its longitudinal center line while inserted in a mass of the frozen confection to break the contents of the cylinder free from the mass.

2. A dispensing scoop comprising a cylinder open at both ends, a disk therein slidable lengthwise in the cylinder from a position near one end of the cylinder to the other end of the cylinder, a handle rigidly attached to the cylinder, means carried by the handle and connected to the disk for moving said disk, a pair of rigid fingers spaced apart within the cylinder and extending the length thereof, said fingers each being adjacent to and parallel to the cylinder wall and spaced therefrom throughout their length and being rigidly attached to said handle, said disk having two spaced apart apertures therein through which said fingers extend.

3. The invention defined in claim 2 wherein the handle comprises two spaced apart bars extending into said cylinder and rigidly attached thereto and each carrying one of said fingers.

References Cited in the file of this patent

UNITED STATES PATENTS

| | | |
|---|---|---|
| 1,776,258 | Hood | Sept. 23, 1930 |
| 1,978,943 | Harris | Oct. 30, 1934 |
| 2,250,150 | Cameron | July 22, 1941 |
| 2,630,082 | Prince | Mar. 3, 1953 |